May 8, 1956  M. P. LAURENT  2,744,771
PIPE COUPLING RING WITH LOCKING MEANS
Filed Feb. 5, 1951  2 Sheets-Sheet 1
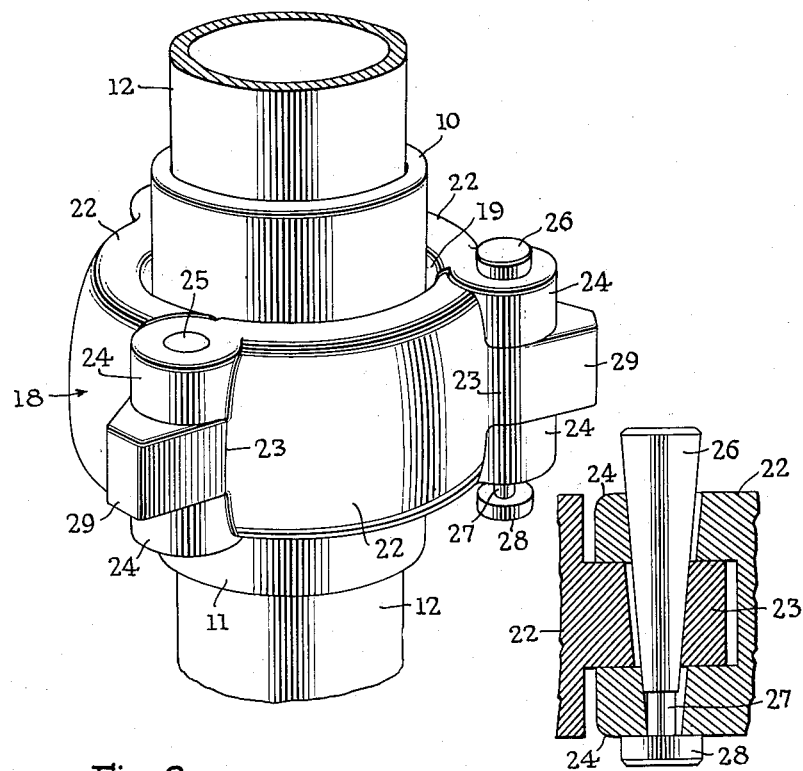
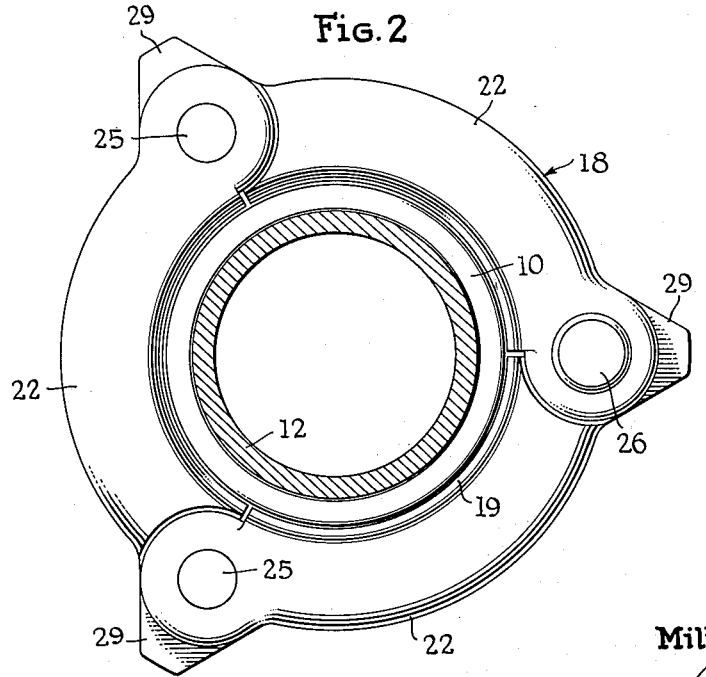
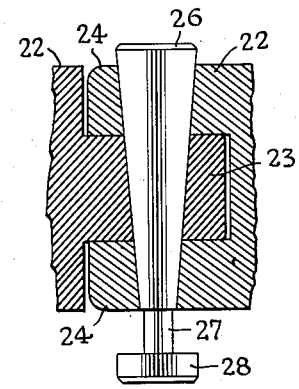
Inventor
Milton P. Laurent
By
Attorney

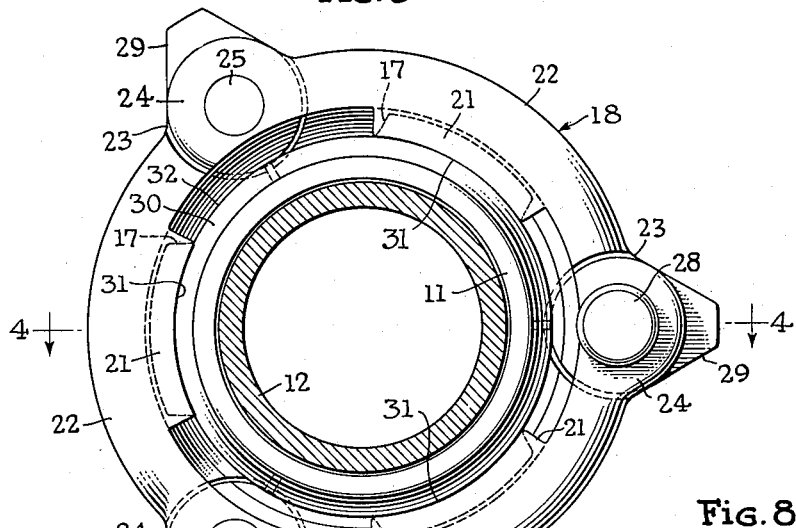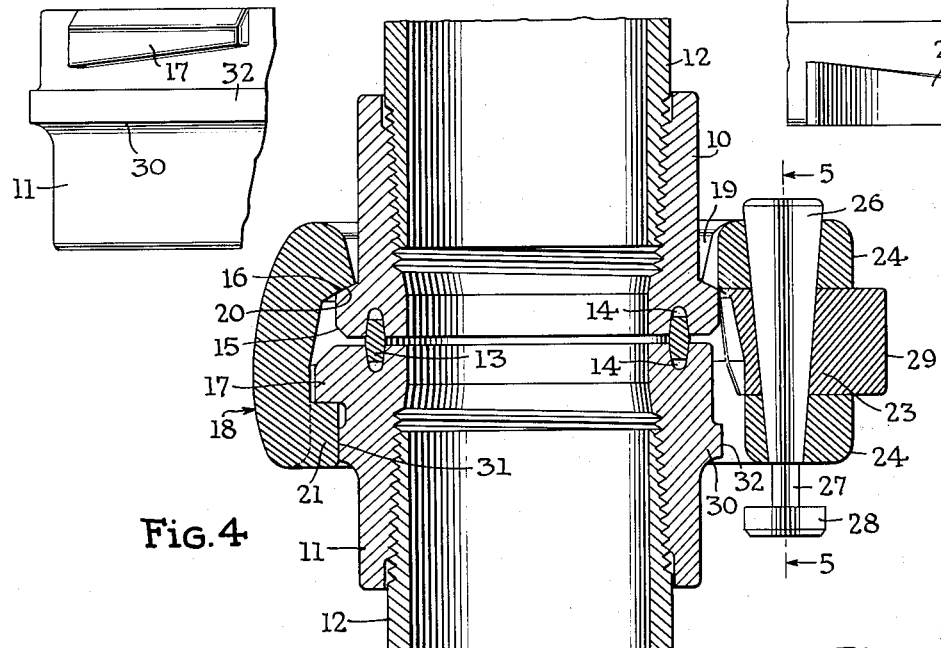

United States Patent Office 2,744,771
Patented May 8, 1956

2,744,771

PIPE COUPLING RING WITH LOCKING MEANS

Milton P. Laurent, Houston, Tex., assignor to Frank A. Rudman, Houston, Tex.

Application February 5, 1951, Serial No. 209,338

4 Claims. (Cl. 285—177)

This invention relates to pipe unions or couplings and more particularly to quick-connectable and disconnectable couplings of the bayonet joint type.

In United States Patents Nos. 2,025,112 and 2,025,113 to M. P. Laurent, there is shown a quick-connectable and disconnectable pipe union having a coupling ring or nut that is operable by only a small fraction of a revolution to couple or uncouple the pipe elements. A single bolt serves to tighten and lock the union in coupled position.

While extremely successful, this patented union has some disadvantages which this invention seeks to overcome. In the first place, the bolt-engaging ear on one of the coupling nipples or hubs is not always conveniently located. This ear-bearing nipple is tightly secured to a pipe end and usually cannot be rotated from its installed position. Hence, in close quarters the ear is frequently installed in an extremely inaccessible position. Consequently, difficulty is had in inserting the bolt and in tightening and locking the coupling. Another disadvantage is the fact that the locking bolt and nut are independent, loose parts that must be detached in order to uncouple the union. Hence, they are easily lost or misplaced. Moreover, the union requires the use of a wrench to tighten the nut and bolt, an operation that is somewhat time consuming. A further disadvantage lies in the fact that casting is the most satisfactory method of fabricating certain of the parts, principally the ring member, an operation more expensive than forging.

Hence, it is an object of this invention to provide a pipe coupling of the type described wherein the final position of the locking means can be adjusted, circumferentially, of the union, into the most accessible location.

It is another object of this invention to provide a pipe coupling of the type described that can be tightened and locked, or unlocked and loosened, solely by time-saving hammer blows.

It is still another object of this invention to provide a simple, yet effective, leak-proof pipe coupling that can be fabricated satisfactorily by forging operations instead of more expensive casting operation.

It is a further object of this invention to provide a pipe coupling of the type described that has no detachable, easily-lost, independent parts.

Other objects and advantages of the invention will be apparent from the following description and accompanying drawings in which:

Figure 1 is a perspective view of a coupling, embodying this invention, connecting two pipe elements, Figure 2 is a top view of the coupling shown in Figure 1, Figure 3 is a bottom view of the coupling shown in Figure 1, Figure 4 is a sectional view taken on line 4—4 of Figure 3, Figure 5 is a fragmentary sectional view taken on line 5—5 of Figure 4, Figure 6 is a view corresponding to Figure 5 illustrating the unlocked position of the parts there shown, Figure 7 is a fragmentary side view of one of the coupling elements, Figure 8 is a fragmentary view of a portion of the inner side of the coupling ring.

Referring now to the drawings, the union comprises two aligned coupling hubs or nipples 10, 11 adapted to be threaded, as shown, or otherwise suitably secured, as by welding, to the ends of the pipes 12 to be coupled. As illustrated in Figure 4, the juxtaposed ends of the nipples are provided with a gasket-type seal comprising a metallic sealing ring 13 seated in annular grooves 14. It will be realized, however, that other types of appropriate seals may be effected between the ends of the nipples. One of the nipples, 10, as illustrated, is provided with an outer, preferably integral, circumferential flange 15 adjacent the mating end thereof. Preferably this flange has a rear face or shoulder 16 that is shaped as a segment of a sphere for reasons later described. The other nipple 11 is provided, adjacent its mating end, with a plurality of outer, preferably integral, radial shelves or lugs 17. These lugs are evenly spaced circumferentially about the nipple 11 with the spaces therebetween slightly greater than the circumferential length of the lugs. The rearward faces of the lugs 17 are substantially helically disposed, as shown in Figure 7.

Disposed over the nipples 10, 11 is a coupling nut or ring 18 having, adjacent one end thereof, an inner circumferential flange 19. The inner diameter of this flange is greater than the outer diameter of the body portion of the nipple 10 but less than the outer diameter of the flange 15 thereon. The inner face or shoulder 20 of the flange 19 is also shaped as a segment of a sphere and is machined to the same radius as the face 16 in order to perfectly mate with the latter. The ring 18 is provided, adjacent the other end thereof, with a plurality of inner radial shelves or lugs 21, corresponding in number, spacing, and circumferential dimension to the lugs 17 on the nipple 11. The radial dimension of the ring lugs 21 is such as to permit them to pass through the spaces between the nipple lugs 17 when the ring is slid axially along the nipples, but to cause their engagement with the rearward faces on the nipple lugs when the two flanges 15 and 19 are in engagement and the ring is rotated to the circumferential position shown in Figure 3, in effect a bayonet joint. The inner faces of the ring lugs 21 are also helically disposed, as shown in Figure 8, to mate with the faces of the nipple lugs 17, so that relative rotation in one direction between the ring 18 and the nipple 11 effects a wedging action that forcefully urges the juxtaposed ends of the nipples together to cause a tight seal therebetween.

The coupling ring 18 comprises a plurality of arcuate segments 22, preferably at least three as illustrated, although a larger number may be used for joining pipes of large diameter. The adjacent ends of the segments 22 are connected together by hinges for relative pivotal movement transversely of the axis of the union. The hinges preferably are formed by an interfitting tongue 23 and bifurcated parts 24 joined by a hinge pin. Most of the hinges have permanently installed hinge pins 25, but at least one has a tapered locking pin 26 fitting in correspondingly tapered bores, as shown in Figures 4–6. Hence, partial withdrawal of this pin, as shown in Figure 6, permits a slight separation of the corresponding segments 22, i. e. play in the hinge, thus slightly increasing the diameter of the ring 18. The smaller end of the locking pin 26 has an axial extension 27 of no greater diameter than that of the smaller end. A head 28 of greater diameter than the smaller end of the locking pin is secured on the end of the extension 27 to serve as a keeper and prevent complete withdrawal of the pin 26, thereby eliminating the possibility of losing or misplacing the pin. The head 28 preferably is welded to the extension 27 after assembly of the ring 28 and locking pin 26. In some instances, however, the head 28 can be threaded onto the extension 27 so that the head can be screwed against the side of the ring to effect a relatively permanent lock as later described. Each segment 22 of the ring is also provided with a radial exterior impact lug 29, preferably on the hinge tongue 23, as shown, to receive hammer blows for rotating the ring. Similar impact lugs (not shown) can also be provided on the hinge bifurcated parts 24, on both sides of the tongue lugs.

Because of their shape, it will be seen that the segments 22 can easily be fabricated by forging operations instead of the more expensive casting operations usually necessitated by the hollow shape of an integral coupling ring of this type. Additionally, the flexibility imparted to the ring 18 by its segmental hinged construction is an aid to the proper circumferential alignment of the juxtaposed ends of the coupling nipples 10, 11.

The nipple 11 is provided with an outer, relatively broad, circumferential flange 30 adjacent the lugs 17 and disposed immediately beneath the ring lugs 21 when the coupling ring 18 is in coupling engagement with the nipples 10 and 11. The diameter of this flange is small enough to permit the inner arcuate surfaces 31 of the ring lugs 21 to just clear the peripheral face 32 of the flange when the coupling ring 18 is expanded. In contracted condition of the coupling ring 18, however, the inner surfaces 31 of the ring lugs engage the peripheral surface 32 of the flange.

In order to couple two pipes with this coupling device, the nipples 10, 11 are secured to the adjacent pipe ends with the coupling ring 18 in proper position over the nipple 10. The sealing ring 13 is inserted in one of the grooves 14 and the ends of the nipples placed in juxtaposition. The locking pin 26 is withdrawn to its fullest extent and the ring 18 rotated to bring the locking pin into its most accessible circumferential position. Three sets of tightening lugs 17, 21 are shown in the drawings. Hence, in the particular embodiment illustrated the ring 18 has three circumferential coupled positions spaced 120° apart. It will be realized, however, that a greater number of sets of tightening lugs can be provided with a corresponding increase in the number of circumferential positions of the ring. The ring is then slid axially toward the nipple 11 with the ring lugs 21 passing between the nipple lugs 17. The ring is then rotated to engage the mating helically disposed surfaces of the lugs 17, 21. A hammer blow on one of the impact lugs 29 serves to tighten the coupling. Thereafter, the locking pin 26 is driven home by a hammer blow to thereby slightly contract the ring and lock it against rotation by clamping engagement of the inner surfaces 31 of the ring lugs with the peripheral surface 32 of the nipple flange, as shown in Figures 3 and 4. Because of the mating segmental-spherical surfaces 16 and 20 on the flanges 15 and 19, respectively, the nipple 10 and the ring 18 can align properly upon contraction of the latter and compensate for irregularities in the lugs 17 and 21. A hammer blow on the head 28 of the locking pin and a similar blow on one of the impact lugs serves to unlock and release the coupling.

In the event that the coupling is used on pipes of very large diameter, as previously stated the number of ring segments preferably is increased. Also, two locking pins preferably are employed, on substantially opposite sides of the ring. The added locking pin serves to more evenly distribute the contraction forces circumferentially of the ring.

Although the invention has been described with respect to a coupling for joining two aligned pipes and including coupling nipples adapted to be connected to the pipe ends, it also has various other applications, such as securing a blanking plug to the end of a pipe, fastening a return bend to the adjacent ends of parallel pipes, etc. It also will be realized that separate coupling nipples may be dispensed with and the corresponding lugs and flanges formed directly on the pipes, blanking plugs, return bends, etc., to be coupled.

It will thus be seen that the objects of the invention have been accomplished effectively. It will also be realized that various modifications of the invention will occur to one skilled in the art. Therefore the invention encompasses all embodiments that come within the spirit and scope of the following claims.

I claim:

1. A pipe union comprising: aligned cylindrical elements to be coupled, at least one of which is tubular, one provided with an outer circumferential flange and the other with a plurality of circumferentially-spaced outer radial lugs; means for sealing the juxtaposed ends of said elements; a coupling ring engaging over said flange and lugs, having an inner circumferential flange engaging with the rearward face of said outer flange and a plurality of inner radial lugs engaging with the rearward faces of said outer lugs by axial and rotative movement of said ring, the engaging surfaces of said outer and inner lugs being substantially helically disposed for forcing said elements together upon relative rotation in one direction between said ring and said other element, said ring comprising a plurality of arcuate segments having their adjacent ends hingedly connected together about axes parallel to the longitudinal axis of the union, at least one hinge connection including a tapered hinge pin disposed in correspondingly tapered, substantially aligned bores formed in interfitting segment ends, in order to effect contraction and release of said ring by axial movement of said pin, said other cylindrical element being provided with peripheral portions spaced axially of the said outer radial lugs and clampingly engaged by the inner peripheral faces of the said inner radial lugs on the coupling ring upon contraction of the latter to lock said ring against rotation; and a plurality of impact receiving lugs extending radially outward from the outer periphery of said ring for effecting rotation of the ring relative to the other element by a hammer blow.

2. The structure defined in claim 1 in which the smaller end of the tapered pin is provided with an axial extension of no greater transverse dimension than said smaller end and a head on the end of said extension of greater transverse dimension than said smaller end.

3. The structure defined in claim 1 in which the engaging surfaces between the outer and inner circumferential flanges are substantially segmental-spherical.

4. The structure defined in claim 1 in which the ring comprises at least three segments.

References Cited in the file of this patent

UNITED STATES PATENTS

| Number | Name | Date |
|---|---|---|
| 626,223 | Cramp | June 6, 1899 |
| 689,109 | Moran | Dec. 17, 1901 |
| 696,603 | Smith | Apr. 1, 1902 |
| 1,065,387 | Ogg | June 24, 1913 |
| 1,183,767 | Radtke | May 16, 1916 |
| 1,957,805 | Rich | May 8, 1934 |
| 1,985,544 | Muchnic | Dec. 25, 1934 |
| 2,013,293 | Snell | Sept. 3, 1935 |
| 2,025,113 | Laurent | Dec. 24, 1935 |
| 2,100,873 | Roberts | Nov. 30, 1937 |
| 2,224,610 | Schellin | Dec. 10, 1940 |
| 2,283,974 | Dillon | May 26, 1942 |
| 2,417,025 | Volpin | Mar. 4, 1947 |

FOREIGN PATENTS

| Number | Country | Date |
|---|---|---|
| 1,682 | Great Britain | June 11, 1870 |
| 318,976 | Germany | Jan. 13, 1918 |
| 542,910 | Germany | May 20, 1928 |
| 843,778 | Germany | July 8, 1949 |